United States Patent [19]

Galasso et al.

[11] 4,214,037

[45] Jul. 22, 1980

[54] SILICON NITRIDE COATED CARBON FIBERS AND COMPOSITES

[75] Inventors: Francis S. Galasso, Manchester; Richard D. Veltri, East Hartford, both of Conn.

[73] Assignee: United Technologies Corporation, Hartford, Conn.

[21] Appl. No.: 25,528

[22] Filed: Mar. 30, 1979

[51] Int. Cl.$^2$ ............................................. C23C 11/08
[52] U.S. Cl. ............................... 428/367; 260/37 EP; 260/37 N; 260/39 R; 428/375; 428/392; 428/408; 428/902
[58] Field of Search ............... 428/367, 375, 392, 408, 428/902; 260/37 EP, 37 N, 39 R, 42.15, 42.16, 42.37; 428/551; 75/205

[56] References Cited

U.S. PATENT DOCUMENTS

| | | | |
|---|---|---|---|
| 3,713,865 | 1/1973 | Leeds | 428/367 |
| 3,785,916 | 1/1974 | Turton | 428/367 |
| 4,146,668 | 3/1979 | Dorey | 428/367 |

*Primary Examiner*—Marion E. McCamish
*Attorney, Agent, or Firm*—Charles E. Sohl

[57] ABSTRACT

Silicon nitride coated carbon fibers and composite materials incorporating these fibers are disclosed. The silicon nitride coating provides electrical insulation and improved resistance to environmental degradation. The resultant coated fibers may be embedded in organic or metal matrices to form composite materials.

3 Claims, No Drawings

SILICON NITRIDE COATED CARBON FIBERS AND COMPOSITES

BACKGROUND OF THE INVENTION

1. Field of Invention

This invention relates to the field of carbon fibers and to the field of carbon fiber composite materials.

2. Description of the Prior Art

It is now known that fibers produced from certain materials have exceptional mechanical properties, property values which are many times greater than those of the same material produced in bulk form. Because of their form, however, such fibers have limited utility. To increase the utility, it is known to combine such fibers in a suitable matrix material to form a composite material having a good overall combination of properties. Such a composite material is typlified by the material commonly known as fiberglass which consists of glass fibers in an organic resin matrix. Among the fibers which have been used in composites are glass fibers, boron fibers, ceramic fibers, metal fibers and carbon fibers. An overview of the fiber composite area is presented in the book entitled "High Modulus Fibers and Composites" by F. S. Galasso, published by Gordon and Breach, Science Publishers, Inc., New York, N.Y., 1969.

Carbon fibers have received a great deal of attention since they have a low density and high modulus. Such fibers are typically produced by heating an organic precursor fiber at a high temperature to carbonize the fiber and then graphitize the carbonized fiber. Commercial carbon fibers have diameters of 5–10 microns can be quite long; e.g., 10 feet. Such carbon fibers can be used in conjunction over a wide variety of organic matrices to produce composite materials. The specific details of the fiber preparation and matrix material do not form a part of the present invention. Rather the invention is directed at a method for increasing the electrical resistance of the carbon fibers and their resistance to oxidation and corrosion so that when the fibers are incorporated in an organic matrix they will have high stability; and in the event of a fire and subsequent release into the air will not cause electrical short circuits.

$Si_3N_4$ coated carbon fibers may also be advantageously combined with metal matrices. The $Si_3N_4$ surface is wet by molten metal more readily than the uncoated carbon surface.

SUMMARY OF THE INVENTION

Carbon fibers are provided with a thin adherent coating of silicon nitride within certain thickness ranges. The silicon nitride coating adheres strongly to the carbon fibers and is an electrical insulator which renders the carbon fiber essentially non-conductive. The silicon nitride also has a high resistance to oxidation and other high temperature surface reaction attacks. These fibers may be incorporated in a conventional organic matrix to produce improved composite materials which, in the event of fire or other catastrophic failures, will not release electrically conductive fibers which potentially can interfere with electric circuitry. Methods for producing the silicon nitride coating by a gas phase deposition process are described.

The foregoing and other objects, features and advantages of the present invention will become more apparent in light of the following detailed description of the preferred embodiments.

DESCRIPTION OF THE PREFERRED EMBODIMENTS

Carbon fibers are provided with a silicon nitride coating to improve certain of their properties. The silicon nitride is produced by a chemical vapor deposition process such as that described in U.S. Pat. No. 3,226,194 which is incorporated herein by reference.

Briefly, this patent describes a method for depositing pyrolytic silicon nitride on a substrate by maintaining the substrate at an elevated temperature; e.g., 1500° C. and passing the gaseous mixture containing $SiF_4$ over the substrate. Preferably, gas contains about 75% ammonia with the partial pressure of the reacted gases maintained less than about $100^{mm}$ of mercury.

The $SiF_4$, other silicon halides or silane, can be reacted with $NH_3$ or $N_2$ on the hot substrate surfaces to produce an amorphous or $\alpha Si_3N_4$. While the $SiF_4$—$NH_3$ reaction is best run at 1400°–1600° C., the reaction of silane with nitrogen containing gases can be run at lower temperatures.

These processes may readily be used to apply silicon nitride to carbon fibers. Carbon fibers vary in their properties according to the method of production. It does not appear that the method of production or the nature of the carbon fiber has significant effect on the suitability of the fiber for the deposition of silicon nitride.

Typically, fibers are provided in the form of a yarn which consists of a large number of fibers loosely bundled together. It is a surprising feature of this invention that even when upwards of 10,000 fibers are bundled together to form a strand of yarn the chemical vapor deposition of silicon nitride produces an essentially uniform coating of silicon nitride over the surface of each fiber even on those fibers at the center of the yarn and even on those areas of fibers which are in close proximity to one another.

One limitation which must be placed on the silicon nitride layer is that its thickness must be limited so that the silicon nitride does not entirely fill the interfiber areas in the yarn. That is to say the silicon nitride must coat the individual fibers without bonding the fibers together. The strength of the composite depends in part upon maximum bond area between each fiber and the matrix. This result is achieved if the coating thickness is limited to less than about 2 microns.

A primary benefit of the invention is that the silicon nitride coating provides electrical insulation to the carbon fiber. In the absence of such an insulating coating, carbon fibers are sufficiently conductive to cause short circuits in electrical equipment. This problem has been of sufficient importance that the desirability in incorporating carbon fiber organic composite material in aircraft has been questioned, since in the event of a minor fire the fibers released by the fire might incapacitate the electrical system.

It has also been suggested that the small size and low density of the fibers would result in the fibers remaining airborne for a long period of time thus posing hazards in industrial plants and other similar situations.

It has been determined that sufficient insulating properties to prevent arcing in 110 V circuits can be obtained with little as 0.4 microns thickness of silicon nitride and for lower voltage circuits thinner coatings can be used. The broad range for the coating thickness of silicon nitride is 0.05 to 2 microns.

Carbon fibers sold under the trade name HTS by Hercules and having an average diameter of 8u were coated with silicon nitride by holding the fibers in a chamber containing a mixture of silicon-tetrafluoride and ammonia in a ratio of 3.5 to 1 at a pressure of $2^{mm}$ of mercury. The fibers were maintained at a temperature at about 1450° C. Under these conditions, reaction times are from 5 to 60 minutes produced coating thickness in the range of about 0.4 microns to 2 microns. The fibers thus coated were evaluated by placing the fibers in metal contacts spaced 2 inches apart having an applied voltage of 110 volts AC. The coated fibers displayed no significant electrical activity. An uncoated fiber underwent instantaneous catastrophic burning in this test.

Similar coating results can be obtained in a continuous process in which the carbon fiber or yarn to be coated would be drawn slowly through a reaction chamber containing the silicon-tetrafluoride-ammonia mixture. Likewise, the previously described silane deposition process could be adapted for use in a continuous process.

$Si_3N_4$ coated carbon fibers can be incorporated in organic matrices and metal matrices. The use of $Si_3N_4$ coated carbon fibers in organic matrices will circumvent concerns about the release of electrically conductive carbon fibers in the event of fire. Typical organic matrices are those in the classes known as epoxies and polyimides. Representative epoxy materials are those sold by the Minnesota Mining and Manufacturing Corporation under the designations PR-286 and PR-288 and that sold by Hercules, Inc. under the designation 3501. A representative polyimide is one sold by Hercules, Inc. under the designation 3004.

Use of $Si_3N_4$ coated carbon fibers in metal matrices offers another benefit. Metals such as Al, Mg and Ti do not readily wet carbon fibers. Thus it is difficult to produce metal matrix-carbon fiber composites. A $Si_3N_4$ surface is wettable by these metals and their alloys, probably by virtue of the formation of a surface monolayer of $SiO_2$. This coating carbon fiber with $Si_3N_4$ permits the fabrication of metal matrix-carbon fiber composites.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A non-conductive fiber which comprises: a carbon fiber having a thin adherent coating of silicon nitride, said coating having a thickness of from about 0.05 to about 2 microns.

2. A carbon fiber reinforced composite material which comprises a metal matrix selected from the group consisting of aluminum, magnesium, titanium and alloys based on aluminum, magnesium and titanium which contains carbon fibers which are coated with a layer of silicon nitride from about 0.05 to about 2 microns thick.

3. A carbon fiber reinforced composite material which comprises an organic matrix selected from the group consisting of epoxies and polyimide which contains carbon fibers which are coated with a layer of silicon nitride from about 0.05 to about 2 microns thick.

* * * * *